United States Patent
Yegani et al.

(10) Patent No.: US 7,936,722 B2
(45) Date of Patent: May 3, 2011

(54) SYSTEM AND METHOD FOR HANDOVER OF AN ACCESS TERMINAL IN A COMMUNICATION NETWORK

(75) Inventors: Parviz Yegani, Danville, CA (US); Jayaraman Iyer, Sunnyvale, CA (US); Timothy P. Stammers, Raleigh, NC (US); Anand K. Oswal, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 103 days.

(21) Appl. No.: 11/682,735

(22) Filed: Mar. 6, 2007

(65) Prior Publication Data

US 2007/0206539 A1     Sep. 6, 2007

Related U.S. Application Data

(60) Provisional application No. 60/780,176, filed on Mar. 6, 2006.

(51) Int. Cl.
 *H04W 4/00* (2009.01)
(52) U.S. Cl. ........ 370/331; 370/328; 370/342; 370/352; 370/469; 370/545; 455/436; 709/201; 709/203; 709/222; 709/223
(58) Field of Classification Search .................. 370/331, 370/328, 342, 352, 469, 545; 455/436; 709/201, 709/203, 222, 223
 See application file for complete search history.

(56) References Cited

U.S. PATENT DOCUMENTS

| | | | |
|---|---|---|---|
| 5,602,907 A | 2/1997 | Hata et al. | 379/114 |
| 5,822,411 A | 10/1998 | Swale et al. | 379/111 |
| 5,828,737 A | 10/1998 | Sawyer | 379/114 |
| 5,905,736 A | 5/1999 | Ronen et al. | 370/546 |
| 5,909,238 A | 6/1999 | Nagashima et al. | 348/3 |
| 5,946,670 A | 8/1999 | Motohashi et al. | 705/400 |
| 5,956,391 A | 9/1999 | Melen et al. | 379/114 |
| 5,970,477 A | 10/1999 | Roden | 705/32 |
| 5,987,498 A | 11/1999 | Athing et al. | 709/203 |

(Continued)

FOREIGN PATENT DOCUMENTS

WO          WO 98/26381          12/1997

(Continued)

OTHER PUBLICATIONS

Online Inc., "Apogee Releases Content Usage-Based Billing Product Annotated Title—Software allows content usage-based billing," EContent, vol. 24, No. 5, NDN 173-0356-6509-7, 1 pg, Jul. 2001.

(Continued)

*Primary Examiner* — Pierre-Louis Desir
(74) *Attorney, Agent, or Firm* — Baker Botts L.L.P.

(57) ABSTRACT

In one embodiment according to the present disclosure, a system for implementing handover of a mobile IP session in a cellular communication network generally includes a processor and a memory for storing one or more context information rules associated with an access terminal. The processor is operable to receive a registration request message from the target radio network controller and in response to receipt of the registration request message, transmit a context information request message to query context information from an anchor IP gateway. The processor is also operable to receive a context information response message from the anchor IP gateway and apply the context information response message to the mobile IP connection. The context information response message including at least one context information rule that is associated with the access terminal.

15 Claims, 3 Drawing Sheets

U.S. PATENT DOCUMENTS

| | | | |
|---|---|---|---|
| 6,016,509 A | 1/2000 | Dedrick | 709/224 |
| 6,035,281 A | 3/2000 | Crosskey et al. | 705/14 |
| 6,047,051 A | 4/2000 | Ginzboorg et al. | 379/130 |
| 6,070,192 A | 5/2000 | Holt et al. | 709/227 |
| 6,075,854 A | 6/2000 | Copley et al. | 379/211 |
| 6,131,024 A | 10/2000 | Boltz | 455/405 |
| 6,137,791 A | 10/2000 | Frid et al. | 370/352 |
| 6,141,684 A | 10/2000 | McDonald et al. | 709/222 |
| 6,175,879 B1 | 1/2001 | Shah et al. | 709/330 |
| 6,208,977 B1 | 3/2001 | Hernandez et al. | 705/34 |
| 6,229,887 B1 | 5/2001 | Albers et al. | 379/219 |
| 6,282,573 B1 | 8/2001 | Darago et al. | 709/229 |
| 6,295,447 B1 | 9/2001 | Reichelt et al. | 455/417 |
| 6,330,562 B1 | 12/2001 | Boden et al. | 707/10 |
| 6,332,163 B1 | 12/2001 | Bowman-Amuah | 709/231 |
| 6,339,832 B1 | 1/2002 | Bowman-Amuah | 714/35 |
| 6,434,568 B1 | 8/2002 | Bowman-Amuah | 707/103 R |
| 6,434,628 B1 | 8/2002 | Bowman-Amuah | 714/48 |
| 6,438,594 B1 | 8/2002 | Bowman-Amuah | 709/225 |
| 6,442,748 B1 | 8/2002 | Bowman-Amuah | 717/108 |
| 6,466,964 B1 | 10/2002 | Leung et al. | 709/202 |
| 6,477,580 B1 | 11/2002 | Bowman-Amuah | 709/231 |
| 6,477,665 B1 | 11/2002 | Bowman-Amuah | 714/39 |
| 6,480,485 B1 | 11/2002 | Kari et al. | 370/352 |
| 6,490,451 B1 | 12/2002 | Denman et al. | 455/436 |
| 6,493,547 B1 | 12/2002 | Raith | 455/405 |
| 6,496,850 B1 | 12/2002 | Bowman-Amuah | 709/203 |
| 6,502,213 B1 | 12/2002 | Bowman-Amuah | 714/49 |
| 6,510,513 B1 | 1/2003 | Danieli | 713/156 |
| 6,529,909 B1 | 3/2003 | Bowman-Amuah | 707/10 |
| 6,529,948 B1 | 3/2003 | Bowman-Amuah | 709/217 |
| 6,539,396 B1 | 3/2003 | Bowman-Amuah | 707/103 R |
| 6,549,949 B1 | 4/2003 | Bowman-Amuah | 709/236 |
| 6,550,057 B1 | 4/2003 | Bowman-Amuah | 717/126 |
| 6,571,282 B1 | 5/2003 | Bowman-Amuah | 709/219 |
| 6,578,068 B1 | 6/2003 | Bowman-Amuah | 709/203 |
| 6,601,192 B1 | 7/2003 | Bowman-Amuah | 714/38 |
| 6,601,234 B1 | 7/2003 | Bowman-Amuah | 717/108 |
| 6,606,660 B1 | 8/2003 | Bowman-Amuah | 709/227 |
| 6,611,821 B2 | 8/2003 | Stahl et al. | 705/400 |
| 6,615,199 B1 | 9/2003 | Bowman-Amuah | 706/50 |
| 6,615,253 B1 | 9/2003 | Bowman-Amuah | 709/219 |
| 6,615,263 B2 | 9/2003 | Dulai et al. | 709/225 |
| 6,621,820 B1 | 9/2003 | Williams et al. | 370/395.31 |
| 6,636,242 B2 | 10/2003 | Bowman-Amuah | 715/764 |
| 6,640,238 B1 | 10/2003 | Bowman-Amuah | 709/201 |
| 6,640,244 B1 | 10/2003 | Bowman-Amuah | 709/207 |
| 6,647,262 B1 | 11/2003 | Demetrescu et al. | 455/436 |
| 6,665,537 B1 | 12/2003 | Lioy | 455/435 |
| 6,665,718 B1 | 12/2003 | Chuah et al. | 709/225 |
| 6,671,675 B2 | 12/2003 | Iwamura | 705/30 |
| 6,684,243 B1 | 1/2004 | Euget et al. | 709/222 |
| 6,684,256 B1 | 1/2004 | Warrier et al. | 709/238 |
| 6,708,225 B1 | 3/2004 | Cho et al. | 709/317 |
| 6,714,515 B1 | 3/2004 | Marchand | 370/231 |
| 6,715,145 B1 | 3/2004 | Bowman-Amuah | 718/101 |
| 6,728,266 B1 | 4/2004 | Sabry et al. | 370/468 |
| 6,728,365 B1 | 4/2004 | Li et al. | 379/329 |
| 6,728,884 B1 | 4/2004 | Lim | 713/201 |
| 6,742,015 B1 | 5/2004 | Bowman-Amuah | 718/101 |
| 6,742,036 B1 | 5/2004 | Das et al. | 709/226 |
| 6,757,371 B2 | 6/2004 | Kim et al. | 379/114.22 |
| 6,760,444 B1 | 7/2004 | Leung | 380/270 |
| 6,768,726 B2 | 7/2004 | Dorenbosch et al. | 370/331 |
| 6,769,000 B1 | 7/2004 | Akhtar et al. | 707/103 R |
| 6,771,623 B2 | 8/2004 | Ton | 370/331 |
| 6,785,256 B2 | 8/2004 | O'Neill | 370/338 |
| 6,804,518 B2 | 10/2004 | Core et al. | 455/436 |
| 6,826,173 B1 | 11/2004 | Kung et al. | 370/352 |
| 6,829,709 B1 | 12/2004 | Acharya et al. | 713/160 |
| 6,834,341 B1 | 12/2004 | Bahl et al. | 713/156 |
| 6,839,338 B1 | 1/2005 | Amara et al. | 370/338 |
| 6,842,906 B1 | 1/2005 | Bowman-Amuah | 719/330 |
| 6,856,676 B1 | 2/2005 | Pirot et al. | 379/201.01 |
| 6,889,321 B1 | 5/2005 | Kung et al. | 713/153 |
| 6,907,501 B2 | 6/2005 | Tariq et al. | 711/118 |
| 6,910,074 B1 | 6/2005 | Amin et al. | 709/227 |
| 6,915,345 B1 | 7/2005 | Tummala et al. | 709/225 |
| 6,917,605 B2 | 7/2005 | Kakemizu et al. | 370/338 |
| 6,920,503 B1 | 7/2005 | Nanji et al. | 709/230 |
| 6,922,404 B1 | 7/2005 | Narayanan et al. | 370/338 |
| 6,925,160 B1 | 8/2005 | Stevens et al. | 379/121.05 |
| 6,947,401 B2 | 9/2005 | El-Malki et al. | 370/331 |
| 6,961,774 B1 | 11/2005 | Shannon et al. | 709/227 |
| 6,967,941 B2 | 11/2005 | Roy | 370/338 |
| 6,978,128 B1 | 12/2005 | Raman et al. | 455/414 |
| 6,980,802 B2 | 12/2005 | Jung | 455/436 |
| 6,980,962 B1 | 12/2005 | Arganbright et al. | 705/26 |
| 6,981,047 B2 | 12/2005 | Hanson et al. | 709/227 |
| 6,982,967 B1 | 1/2006 | Leung | 370/328 |
| 6,990,337 B2 | 1/2006 | O'Neill et al. | 455/422.1 |
| 6,993,333 B2 | 1/2006 | Laroia et al. | 455/436 |
| 7,003,294 B2 | 2/2006 | Singhai et al. | 455/435.1 |
| 7,020,697 B1 | 3/2006 | Goodman et al. | 709/223 |
| 7,024,687 B2 | 4/2006 | Chaudhuri et al. | 726/3 |
| 7,028,311 B2 | 4/2006 | Roach et al. | 719/328 |
| 7,039,027 B2 | 5/2006 | Bridgelall | 370/329 |
| 7,054,268 B1 | 5/2006 | Paranteinen et al. | 370/231 |
| 7,079,499 B1 | 7/2006 | Akhtar et al. | 370/310 |
| 7,082,301 B2 | 7/2006 | Jagadeesan et al. | 455/436 |
| 7,103,359 B1 | 9/2006 | Heinonen et al. | 455/436 |
| 7,127,234 B2 | 10/2006 | Ishii | 455/411 |
| 7,130,286 B2 | 10/2006 | Koodli et al. | 370/331 |
| 7,133,386 B2 | 11/2006 | Holur et al. | 370/331 |
| 7,151,758 B2 | 12/2006 | Kumaki et al. | 370/331 |
| 7,151,772 B1 | 12/2006 | Kalmanek et al. | 370/390 |
| 7,154,868 B1 | 12/2006 | Sharma et al. | 370/331 |
| 7,161,914 B2 | 1/2007 | Shoaib et al. | 370/331 |
| 7,171,555 B1 | 1/2007 | Salowey et al. | 713/156 |
| 7,184,418 B1 | 2/2007 | Baba et al. | 370/331 |
| 7,187,931 B2 | 3/2007 | Trossen | 455/440 |
| 7,190,793 B2 | 3/2007 | Hsu | 380/270 |
| 7,197,763 B2 | 3/2007 | Hsu | 726/4 |
| 7,212,821 B2 | 5/2007 | Laroia et al. | 455/437 |
| 7,230,951 B2 | 6/2007 | Mizell et al. | 370/401 |
| 7,233,583 B2 | 6/2007 | Asthana et al. | 370/332 |
| 7,251,733 B2 | 7/2007 | Haverinen et al. | 713/182 |
| 7,263,371 B2 | 8/2007 | Das et al. | 455/456.1 |
| 7,269,727 B1 | 9/2007 | Mukherjee et al. | 713/160 |
| 7,272,122 B2 | 9/2007 | Trossen et al. | 370/331 |
| 7,272,123 B2 | 9/2007 | Wall | 370/331 |
| 7,275,156 B2 | 9/2007 | Balfanz et al. | 713/168 |
| 7,389,106 B2 | 6/2008 | Dawson et al. | 455/406 |
| 7,545,767 B2 * | 6/2009 | Zhao et al. | 370/328 |
| 2001/0023428 A1 | 9/2001 | Miyazaki et al. | 709/201 |
| 2002/0021681 A1 * | 2/2002 | Madour | 370/331 |
| 2002/0023174 A1 | 2/2002 | Garrett et al. | 709/245 |
| 2002/0036982 A1 | 3/2002 | Chen | 370/230 |
| 2002/0059114 A1 | 5/2002 | Cockrill et al. | 705/27 |
| 2002/0091802 A1 | 7/2002 | Paul et al. | 709/220 |
| 2002/0138601 A1 | 9/2002 | Piponius et al. | 709/223 |
| 2002/0151312 A1 | 10/2002 | Bos et al. | 455/452 |
| 2003/0021252 A1 | 1/2003 | Harper et al. | 370/338 |
| 2003/0039237 A1 | 2/2003 | Forslow | 370/352 |
| 2003/0154400 A1 | 8/2003 | Pirttimaa et al. | 713/201 |
| 2003/0187817 A1 | 10/2003 | Agrawal et al. | 707/1 |
| 2003/0217165 A1 | 11/2003 | Buch et al. | 709/229 |
| 2004/0114553 A1 | 6/2004 | Jiang et al. | 370/328 |
| 2004/0162876 A1 | 8/2004 | Kohavi | 709/203 |
| 2004/0162892 A1 | 8/2004 | Hsu | 709/221 |
| 2004/0196821 A1 | 10/2004 | Haddad et al. | 370/349 |
| 2004/0210524 A1 | 10/2004 | Benenati et al. | 705/40 |
| 2004/0259562 A1 | 12/2004 | Madour | 455/452.2 |
| 2005/0002407 A1 | 1/2005 | Shaheen et al. | 370/401 |
| 2005/0025132 A1 | 2/2005 | Harper et al. | 370/352 |
| 2005/0130659 A1 | 6/2005 | Grech et al. | 455/436 |
| 2005/0149651 A1 | 7/2005 | Doak et al. | 710/52 |
| 2005/0176428 A1 | 8/2005 | Gabor et al. | 455/435.1 |
| 2005/0195766 A1 | 9/2005 | Nasielski et al. | 370/331 |
| 2005/0201324 A1 | 9/2005 | Zheng | 370/328 |
| 2005/0213606 A1 | 9/2005 | Huang et al. | 370/467 |
| 2005/0220039 A1 | 10/2005 | Hoshino et al. | 370/261 |
| 2005/0278420 A1 | 12/2005 | Hartikainen et al. | 709/203 |
| 2005/0286709 A1 | 12/2005 | Horton et al. | 379/265.09 |
| 2006/0014547 A1 | 1/2006 | Walter | 455/456.1 |
| 2006/0018272 A1 | 1/2006 | Mutikainen et al. | 370/328 |
| 2006/0018280 A1 * | 1/2006 | Kumar et al. | 370/331 |

| | | | | |
|---|---|---|---|---|
| 2006/0077924 | A1 | 4/2006 | Rune | 370/328 |
| 2006/0116113 | A1 | 6/2006 | Gass | 455/414.4 |
| 2006/0126630 | A1 | 6/2006 | Shirazipour et al. | 370/392 |
| 2006/0171310 | A1 | 8/2006 | Ahluwalia et al. | 370/229 |
| 2006/0240825 | A1* | 10/2006 | Funabiki et al. | 455/436 |
| 2006/0251038 | A1 | 11/2006 | Tamura et al. | 370/342 |
| 2006/0264207 | A1 | 11/2006 | Tamura et al. | 455/415 |
| 2006/0268819 | A1 | 11/2006 | Chen et al. | 370/349 |
| 2007/0008882 | A1 | 1/2007 | Oran | 370/229 |
| 2007/0036312 | A1 | 2/2007 | Cai et al. | 379/126 |
| 2007/0086582 | A1 | 4/2007 | Tai et al. | 379/114.01 |
| 2007/0094712 | A1 | 4/2007 | Gibbs et al. | 726/3 |
| 2007/0121615 | A1 | 5/2007 | Weill et al. | 370/389 |
| 2007/0121642 | A1 | 5/2007 | Battin et al. | 370/395.2 |
| 2007/0153720 | A1 | 7/2007 | Baglin et al. | 370/328 |
| 2007/0254661 | A1* | 11/2007 | Chowdhury et al. | 455/436 |

FOREIGN PATENT DOCUMENTS

| | | |
|---|---|---|
| WO | WO 99/31610 | 12/1998 |
| WO | WO 2005/107297 | 11/2005 |

OTHER PUBLICATIONS

Centaur Communications, "Secret Bear platform allows paid-for SMS Annotated Title—Secret Bear introduced cross-network reverse billing platform allowing content providers to charge for SMS content," New Media Age, NDN 173-0354-6130-3, 1 pg, Jun. 28, 2001.

Karsten Lüttge, "E-Charging API: Outsource Charging to a Payment Service Provider," NDN 174-0708-0924-8, pp. 216-227, 2001.

A. Herzberg, "Safeguarding Digital Library Contents: Charging for Online Content," D-Lib Magazine, NDN 174-0590-9051-8, 16 pgs, Jan. 1998.

Business Wire, "Apogee Networks Introduces Industry's First Content Usage-Based Billing Solution for Web Hosters," NDN 219-0281-6988-1, 2 pgs, May 8, 2001.

Business Wire, "Apogee Networks Announces Investment by Cisco Systems; Combined Efforts Enhance Billing Capabilities for Content Delivery Network Providers," NDN 219-0220-9035-0, 2 pgs, Jan. 23, 2001.

Business Wire, "Key Analysts Predict Content Billing is the Internet's New Frontier; Content is the Asset of the Industry; Apogee Networks Seen as the Leader in New Internet Industry Space," NDN 219-0162-6934-6, 3 pgs, Oct. 10, 2000.

Business Wire, "Apogee Networks Unveils NetCountant Wireless Billing At SUPERCOMM; Company Demonstrates Industry First Wireless Content Usage Based Billing Solution," NDN 218-0324-8075-6, 2 pgs, Jun. 5, 2001.

Business Wire, "Apogee Networks Wins 2000 Communications ASP Product of the Year Award; Apogee Networks' NetCountant Billing Takes Top Honors for Innovative Content Usage Based Billing Solutions," NDN 218-0282-3757-7, 2 pgs, Mar. 21, 2001.

Business Wire, "Wireless Internet Content Billing and Settlement Capability Announced; Companies Announce Interoperability Between WAP Gateway and Content Billing System," NDN 218-0220-0997-2, 2 pgs, Dec. 6, 2000.

Business Wire, "Apogee Networks Joins Content Alliance; Billing Expert to Join Industry Group Aimed At Advancing Content Networking," NDN 218-0181-2716-7, 3 pgs, Oct. 11, 2000.

Business Wire, "Apogee Networks, Inc. and Paysys International, Inc. to Integrate Technologies to Create Advanced IP Content Billing Solutions," NDN 218-0098-0623-9, 3 pgs, Jun. 19, 2000.

Ylitalo, et al., *Re-thinking Security in IP based Micro-Mobility*, downloaded from www.tcs.hut.fi/Studies/T-79.5401/2005AUT/ISCO4-Vlitalo-e-al.pdf (12 pages).

PCT Notification of Transmittal of the International Search Report and the Written Opinion of the International Searching Authority, or the Declaration with attached PCT International Search Report and Written Opinion of the International Searching Authority in International Application No. PCT/US 07/05937, dated Oct. 25, 2007, 6 pages, Oct. 25, 2007.

Draft—TR45—PN-3-4732-RV4 (to be published as TIA-835.1-D), 32 pages.

Draft—TR45—PN-3-4732-RV4 (to be published as TIA-835.2-D), 93 pages.

Draft—TR45—PN-3-4732-RV4 (to be published as TIA-835.3-D), 36 pages.

Draft—TR45—PN-3-4732-RV4 (to be published as TIA-835.4-D), 70 pages.

Draft—TR45—PN-3-4732-RV4 (to be published as TIA-835.5-D), 72 pages.

Draft—TR45—PN-3-4732-RV4 (to be published as TIA-835.6-D), 36 pages.

3GPP2 C.S0067, 3rd Generation Partnership Project 2 '3GPP2', "Generic Key Exchange Protocol for cdma2000 High Rate Packet Data Air Interface," Version 1.0, 24 pages, Nov. 2005.

3GPP2 X.S0011-001-D, 3rd Generation Partnership Project 2 '3GPP2', "cdma2000 Wireless IP Network Standard: Introduction," Version 1.0, 33 pages, Feb. 2006.

3GPP2 C.S0063-0, 3rd Generation Partnership Project 2 '3GPP2', "cdma2000 High Rate Packet Data Supplemental," Version 1.0, 127 pages, Mar. 2006.

3GPP2 A.S0008-A v.1.0, 3rd Generation Partnership Project 2 '3GPP2,' Interoperability Specification (IOS) for High Rate Packet Data (HRPD) Radio Access Network Interfaces with Session Control in the Access Network, 257 pages, Mar. 2006.

3GPP2 C.S0024-A, 3rd Generation Partnership Project 2 '3GPP2', "cdma2000 High Rate Packet Data Air Interface Specification," Version 2.0, 1,223 pages, Jul. 2005.

B. Aboba, et al., "Extensible Authentication Protocol (EAP)," Network Working Group, RFC 3748, http://www.ietf.org/rfc/rfc3748.txt, 59 pages, Jun. 2004.

B. Aboba, D. Simon, "PPP EAP TLS Authentication Protocol," Network Working Group, RFC 2716, http://www.ietf.org/rfc/rfc2716.txt, 22 pages, Oct. 1999.

W. Simpson, "PPP Challenge Handshake Authentication Protocol (CHAP)," Network Working Group, RFC 1994, http://www.ietf.org/rfc/rfc1994.txt, 12 pages, Aug. 1996.

W. Simpson, "The Point-to-Point (PPP)," Network Working Group, RFC 1661, http://www.ietf.org/rfc/rfc1661.txt, 47 pages, Jul. 1994.

P. Eronen, et al., "Diameter Extensible Authentication Protocol (EAP) Application," Network Working Group, RFC 4072, http://www.ietf.org/rfc/rfc4072.txt, 29 pages, Aug. 2005.

P. Calhoun, et al., "Diameter Base Protocol," Network Working Group, RFC 3588, http://www.ietf.org/rfc/rfc3588.txt, 129 pages, Sep. 2003.

3rd Generation Partnership Project 2 "3GPP2"; "All-IP Core Network Multimedia Domain: Service Based Bearer Control—Stage 2;www.3gpp2.org-"; Version 1.0. Draft Version 0.21.0, 49 pages.

PCT Notification of Transmittal of the International Search Report and the Written Opinion of the International Searching Authority, or the Declaration, International Application No. PCT/US07/05847, 9 pages, Oct. 26, 2007.

PCT Notification of Transmittal of the International Search Report and the Written Opinion of the International Searching Authority, or the Declaration, International Application No. PCT/US07/05849, 9 pages, Nov. 14, 2007.

Yegani et al., "System and Method for Access Authentication in a Mobile Wireless Network," U.S. Appl. No. 11/419,382, 20 pps, 3 pps drawings (2104), filed May 19, 2006.

Yegani et al., "Enforcement of User Level Policies from Visited Networks in a Mobile IP Environment," U.S. Appl. No. 11/682,817, 22 pps, 2 pps drawings (2359), filed Mar. 6, 2007.

Yegani et al, Authentication of Access Terminals in a Cellular Communication Network,: U.S. Appl. No. 11/682,857, 28 pps, 5 pps drawings (2358), filed Mar. 6, 2007.

Andreasen et al., "System and Method of Consolidating Accounting Data for a Communication Session," U.S. Appl. No. 11/714,974, 40 pps, 3 pps drawings (2404), filed Mar. 6, 2007.

Panda et al., "System and Method for Capturing Accounting Data for a Communication Session," U.S. Appl. No. 11/715,018 (2402), filed Mar. 6, 2007.

Rosenberg et al., "System and Method for Determining a Network for Processing Applications for a Communication Session," U.S. Appl. No. 11/715,019, 40 pps, 3 pps drawings (2406), filed Mar. 6, 2007.

Rosenberg et al., "Determining a Policy Output for a Communication Session," U.S. Appl. No. 11/715,032, 31 pps, 4 pps drawings (2368), filed Mar. 6, 2007.

Leung et al., "Communicating Packets Using a Home Anchored Bearer Path," U.S. Appl. No. 11/715,033, 33 pps, 4 pps drawings (2407), filed Mar. 6, 2007.

Andreasen et al., "Posture-Based Network Authentication," U.S. Appl. No. 11/715,040, 23 pages, 2 pps drawings (2398), filed Mar. 6, 2007.

Iyer et al., "Access Terminal for Communicating Packets Using a Home Anchored Bearer Path," U.S. Appl. No. 11/715,041, 33 pps, 4 pps drawings (2300), filed Mar. 6, 2007.

Rosenberg et al., "System and Method for Exchanging Policy Information in a Roaming Communications Environment," U.S. Appl. No. 11/715,056, 42 pps, 3 pps drawings (2416), filed Mar. 6, 2007.

Rosenberg et al., "Establishing Facets of a Policy for a Communication Session," U.S. Appl. No. 11/715,065, 32 pps, 4 pps drawings (2409), filed Mar. 6, 2007.

Rosenberg et al., "Performing Deep Packet Inspection for a Communication Session," U.S. Appl. No. 11/715,073, 31 pps, 4 pps drawings (2400), filed Mar. 6, 2007.

Rosenberg et al., "Assigning a Serving—CSCF During Access Authentication," U.S. Appl. No. 11/715,074, 22 pps, 2 pps drawings, (2410), filed Mar. 6, 2007.

Rosenberg et al., "System and Method for Providing Emergency Services in a Visited Communications Environment," U.S. Appl. No. 11/715,111, 39 pps, 2 pps drawings (2418), filed Mar. 6, 2007.

Panda et al., "Application-Aware Policy Enforcement," U.S. Appl. No. 11/715,187, 28 pps, 2 pps drawings (2403), filed Mar. 6, 2007.

Andreasen et al., "System and Method for Generating a Unified Accounting Record for a Communication Session," U.S. Appl. No. 11/715,210, 46 pps, 3 pps drawings (2399), filed Mar. 6, 2007.

Andreasen et al., "Network-triggered quality of service (QoS) Reservation," U.S. Appl. No. 11/715,250, 21 pps, 2 pps drawings (2405), filed Mar. 6, 2007.

Andreasen et al.,; "Policy-Based Control of Content Intercept", U.S. Appl. No. 11/715,251, 23 pps, 2 pps drawings (2401).

Rosenberg et al., "System and Method for Network Charging Using Policy Peering," U.S. Appl. No. 11/715,256, 43 pps, 3 pps drawings (2415), filed Mar. 6, 2007.

PCT Notification of Transmittal of the International Search Report and the Written Opinion of the International Searching Authority, or the Declaration with attached PCT International Search Report and Written Opinion of the International Searching Authority in International Application No. PCT/US2006/046800, dated Nov. 10, 2008, 10 pages, Nov. 10, 2008.

* cited by examiner

SYSTEM AND METHOD FOR HANDOVER OF AN ACCESS TERMINAL IN A COMMUNICATION NETWORK

RELATED APPLICATION

This application claims priority under 35 U.S.C. §119(e) of U.S. Provisional application Ser. No. 60/780,176, entitled "VERIZON WIRELESS MULTI-MEDIA PLUS (MMD+) PROGRAM SYSTEM ARCHITECTURE DOCUMENT," filed Mar. 6, 2006, by Flemming Andreasen et al., which is incorporated herein by reference.

TECHNICAL FIELD OF THE INVENTION

This invention relates in general to communication networks, and more particularly to a system for fast handover of an access terminal in a communication network and a method of implementing the same.

BACKGROUND OF THE INVENTION

Cellular communication networks may have a number of base transceiver stations (BTSs) to provide coverage over generally broad geographical areas. Each of these base transceiver stations may be coupled to a radio network controller (RNC) that manages various aspects of cellular communication network. One particular aspect of the cellular communication network that may be managed by the RNC is a process commonly referred to as handover. The process of handover generally refers to actions taken by radio network controller in order to switch an access terminal's point-of-attachment from one BTS to another as the access terminal moves from one location to another.

In practice, a number of cellular communication networks may function together in order to provide a cellular communication environment. Handover between adjacent cellular communication networks providing data communication services is typically provided by a mobile IP protocol. The mobile IP protocol enables access terminals to roam from the home network while maintaining a relatively permanent IP address.

SUMMARY OF THE INVENTION

In one embodiment according to the present disclosure, a system for implementing handover of a mobile IP session in a cellular communication network generally includes a processor and a memory for storing one or more context information rules associated with an access terminal. The processor is operable to receive a registration request message from the target radio network controller and in response to receipt of the registration request message, transmit a context information request message to query context information from an anchor IP gateway. The processor is also operable to receive a context information response message from the anchor IP gateway and apply the context information response message to the mobile IP connection. The context information response message including at least one context information rule that is associated with the access terminal.

Embodiments of the disclosure may provide numerous technical advantages. Some, none, or all embodiments may benefit from the below described advantages. According to one embodiment, a handover mechanism for a mobile IP protocol may be provided that alleviates the need to access authentication or authorization information from a designated home network of an access terminal each time the access terminal roams to a new network. Security keys locally maintained in the anchor IP gateway may be transmitted directly to the target IP gateway during handover. The latency involved with transmitting and receiving authentication or authorization information from the designated home network of the access terminal may be alleviated, which may reduce the overall time required to authenticate the access terminal on the target network.

Other technical advantages will be apparent to one of skill in the art.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Mobile IP protocol enables a relatively stable mechanism for roaming from one communication network to another. Handover of an access terminal having an active mobile IP session in a cellular communication network, however is generally cumbersome in practice. When roaming, for example, the access terminal is typically authenticated with the target cellular communication network for security purposes. Known authentication mechanisms require correspondence of authentication information with the designated home network of the access terminal, a process that is generally complicated and time consuming.

Figure 1:
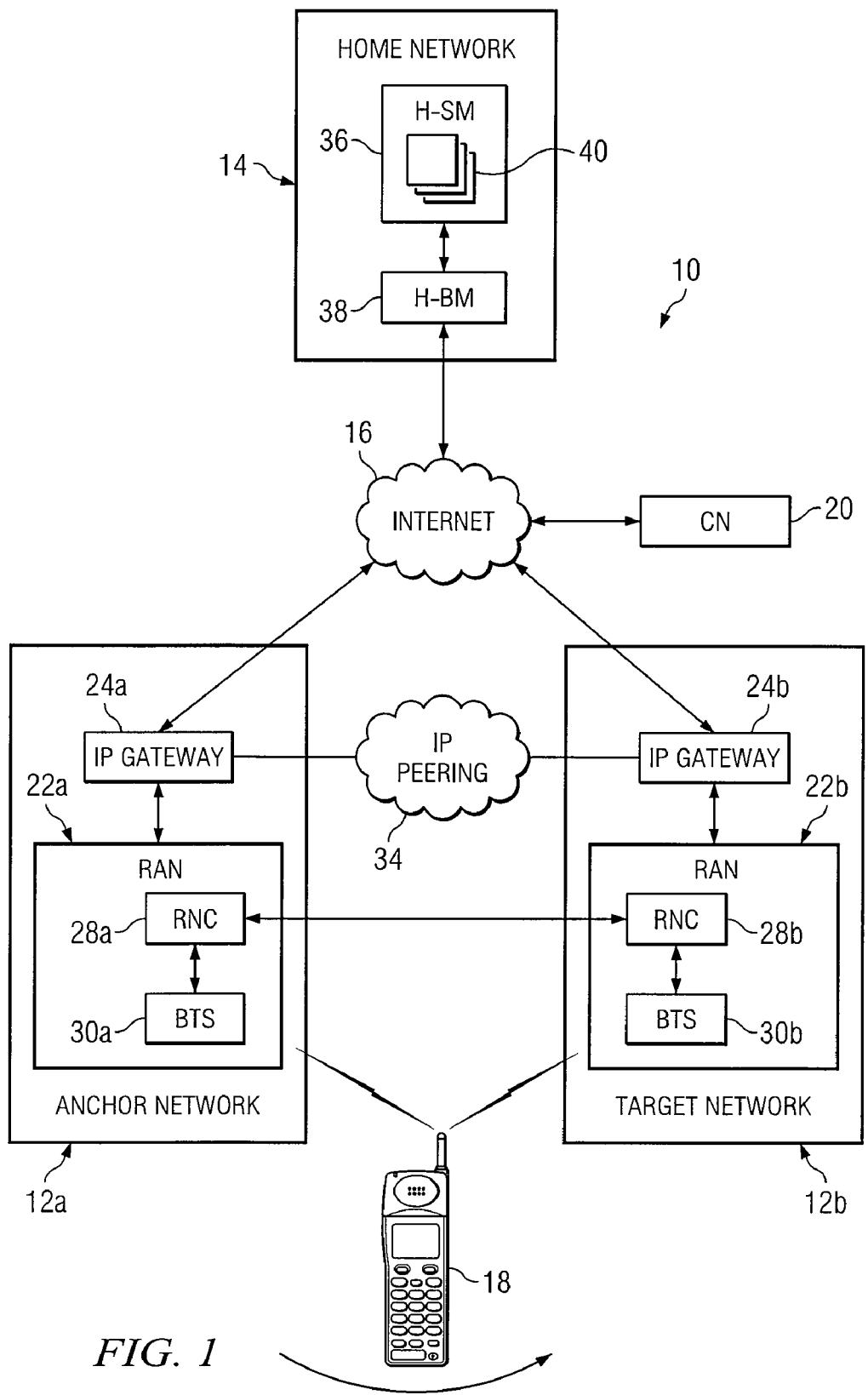
FIG. 1 is a diagram of one embodiment of a cellular communication environment according to one embodiment of the present disclosure.

FIG. 1 shows one embodiment of a cellular communication environment 10 in which may facilitate fast handover of an access terminal according to the teachings of the present disclosure. Cellular communication environment 10 generally includes an anchor network 12a, a target network 12b, and a home network 14 that may be coupled to the IP network 16 for providing various data-based communication services to an access terminal 18. A correspondent node 20 is also coupled to the IP network 16 and generally refers to any suitable node that may communicate with the access terminal 18 through the IP network 16.

According to one embodiment of operation, a system and method for handover of packet-switched services from anchor network 12a to target network 12b is provided that alleviates the need to access authentication or authorization information from the home network 14 of access terminal 18 each time the access terminal 18 roams to a target network 12b.

The anchor network 12a and target network 12b have been designated as an anchor node and target node, respectively, for the purposes of the following discussion in which the access terminal 18 roams from the anchor network 12a to the target network 12b. The anchor network 12a, however may also be designated as a target node and the target network 12b may be designated as an anchor node for scenarios where the access terminal 18 roams from target network 12b to the anchor network 12a.

Access terminal 18 may be any suitable cellular communication network aware device, that may be, for example, a cellular telephone, a personal computer, a pager, a pocket computer, a notebook computer, or a personal digital assistant (PDA). Access terminal 18 may communicate with radio access network 22a using any suitable wireless communication network protocol. Examples of a suitable wireless communication network protocols include code division multiple access (CDMA), integrated digital enhanced network (iDEN), and time division multiple access (TDMA) protocols.

Anchor network 12a generally includes a radio access network 22a, and an IP gateway 24a for providing connectivity to the IP network 16. In one embodiment, anchor network 12a may be an IP multimedia subsystem (IMS) that provides various data communication services, such as, packet-switched voice call services, e-mail messaging services, instant messaging services, and IP network access services. In another embodiment, anchor network 12a is an IP multimedia subsystem based upon the multimedia domain (MMD) architecture developed by the 3rd Generation Partnership Project (3GPP).

The radio access network 22 provides an interface for coupling the access terminal 18 to a packet-switched core network, which in this case, is the IP gateway 24a. Radio access network 14 may be any suitable type of high rate packet data (HRPD) network, such as an Universal Mobile Telecommunications System (UTMS) or a Global System for Mobile Communications (GSM) network telecommunication system.

Radio access network 22a may include a radio network controller (RNC) 28a and one or more base tranceiver stations (BTSS) 30a. Each BTS 30a communicates directly with access terminal 18 using radio frequency (RF) transceivers that transmit and receive RF signals from the access terminal 18. The functions of the RNC 28a may be implemented with a processor executing computer instructions stored in a memory. The RNC 28a controls the operation of each of the BTSs 30a and may route signals from the BTS 30a to the IP gateway 24a.

The IP gateway 24a may be used to route packets between the radio access network 22a and the IP network 16. The functions of the IP gateway 24a may be implemented with a processor executing computer instructions stored in a memory. IP gateway 24a may perform any suitable operations. For example, IP gateway 24a may convert communications from a protocol used by radio access network 22a to a protocol used by the IP network 16, or vice-versa.

Target network 12b generally includes a radio access network 22b and an IP gateway 24b that function in a manner similar to the radio access network 22a and IP gateway 24a of anchor network 12a. Additionally, radio access network 22b may include a RNC 28b and one or more BTSs 30b that function in a manner similar to RNC 28a and BTS 30a of radio access network 22a in anchor network 12a.

RNC 28a may be coupled to RNC 28b over a HRPD network as described above. RNC 28a may communicate with RNC 28b in order to control various aspects of the cellular communication network, such as handover of access terminal 18 when roaming from anchor network 12a to target network 12b.

IP gateway 24a may communicate with IP gateway 24b using any suitable communication link. In one embodiment, IP gateway 24a may communicate with IP gateway 24b through an IP peering link 34.

Home network 14a may be any packet-switch enabled network that is managed by a mobility service provider having an executed service agreement with the user of the access terminal 18. In one embodiment, home network 14 may be an IP multimedia subsystem based upon the multimedia domain (MMD) architecture. Home network 14 generally includes a home security manager 36 that is coupled to a home bearer manager 38. The security manager 24a may function as a server for registration of access terminal 18 to the home network 12a or foreign network 12b. Home security manager 36 may have a memory for storage of context information rules 40 associated with the access terminal 18. In one embodiment, these context information rules 40 may be governed by a service agreement entered into between the mobility service provider and owner of the access terminal 18.

Context information rules 40 may include one or more authentication rules or one or more authorization rules that control various aspects of data based communication services provided to the access terminal 18 by the cellular communication environment 10. Authentication rules may include information that is used to verify that the access terminal 18 is a valid user. As such, the authentication rules may include identification information for use with an authentication protocol, such as, for example, an extended authentication protocol (EAP), or point-to-point protocol (PPP). Authorization rules may include information that may be used to control various aspects of data communication services provided to the access terminal 18, which may include, for example, quality of service (QoS), user security, accounting, user mobility, and packet inspection.

The bearer manager 38 is coupled to security manager 36 and IP gateways in anchor network 12a and target network 12b through the IP network 16. The bearer manager 38 may facilitate authentication and/or authorization of access terminal 18 when access terminal 18 forms a point of attachment to either anchor network 12a or target network 12b.

The home network 14 as described above is a separate entity from the anchor network 12a or target network 12b. The home network 14, however may be the anchor network 12a or target network 12b for scenarios where the access terminal 18 roams from or to the domain, respectively, of the home network 14.

A component of environment 10 may include any suitable arrangement of elements, for example, an interface, logic, memory, other suitable element, or a combination of any of the preceding. An interface receives input, sends output, processes the input and/or output, performs other suitable operation, or performs a combination of any of the preceding. An interface may comprise hardware and/or software.

Logic performs the operations of the component, for example, executes instructions to generate output from input. Logic may include hardware, software, other logic, or a combination of any of the preceding. Certain logic, such as a processor, may manage the operation of a component. Examples of a processor include one or more computers, one or more microprocessors, one or more applications, other logic, or a combination of any of the preceding.

A memory stores information. A memory may comprise computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), other computer-readable medium, or a combination of any of the preceding.

Modifications, additions, or omissions may be made to environment 10 without departing from the scope of the invention. The components of environment 10 may be integrated or separated. Moreover, the operations of environment 10 may be performed by more, fewer, or other components. Additionally, operations of environment 10 may be performed using any suitable logic comprising software, hardware, other logic, or any suitable combination of the preceding. As used in this document, "each" refers to each member of a set or each member of a subset of a set.

Figure 2A:
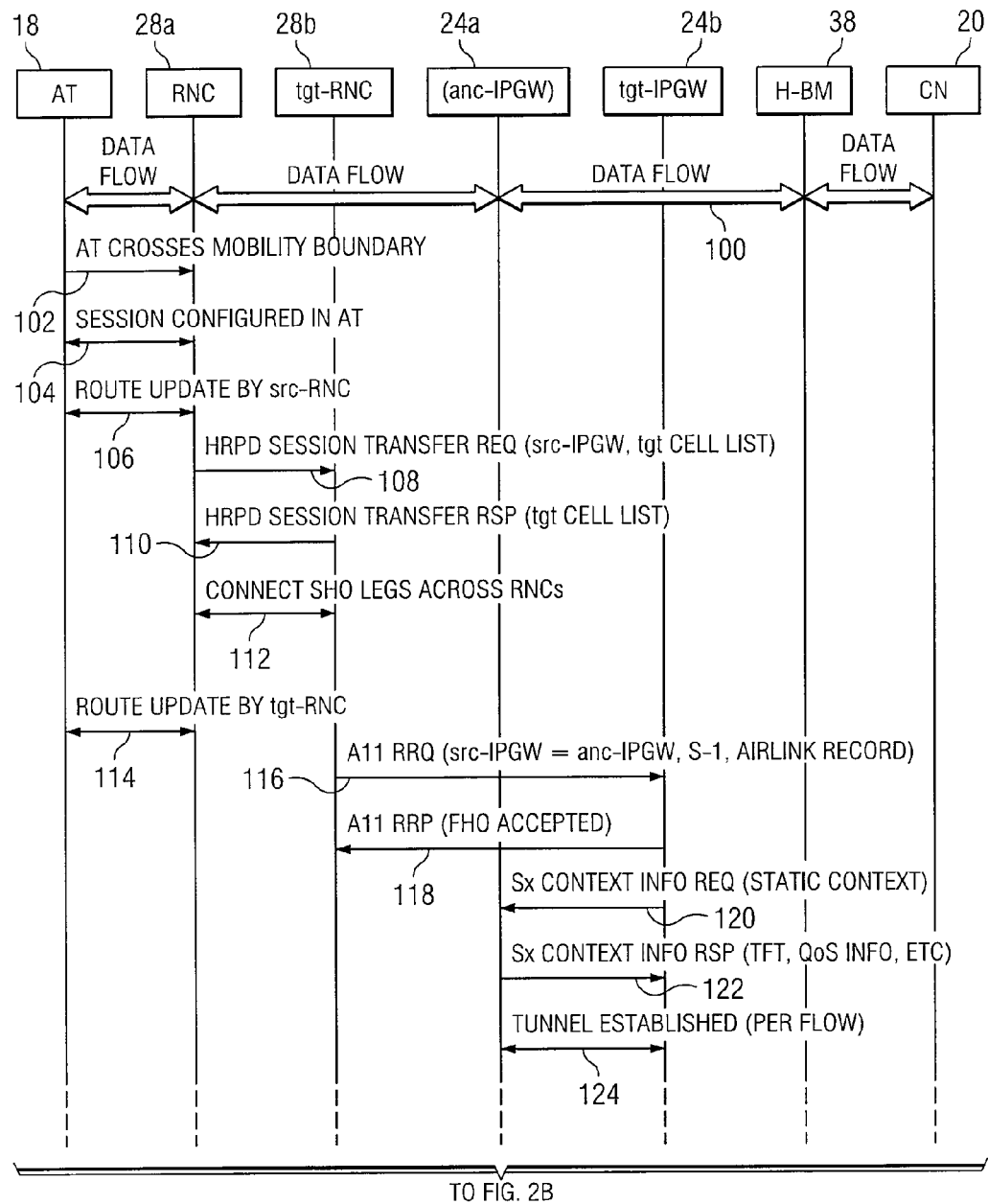
FIG. 2 is a call-flow diagram illustrating one embodiment of a handover method that may be implemented on the cellular communication environment of FIG. 1.
Figure 2B:
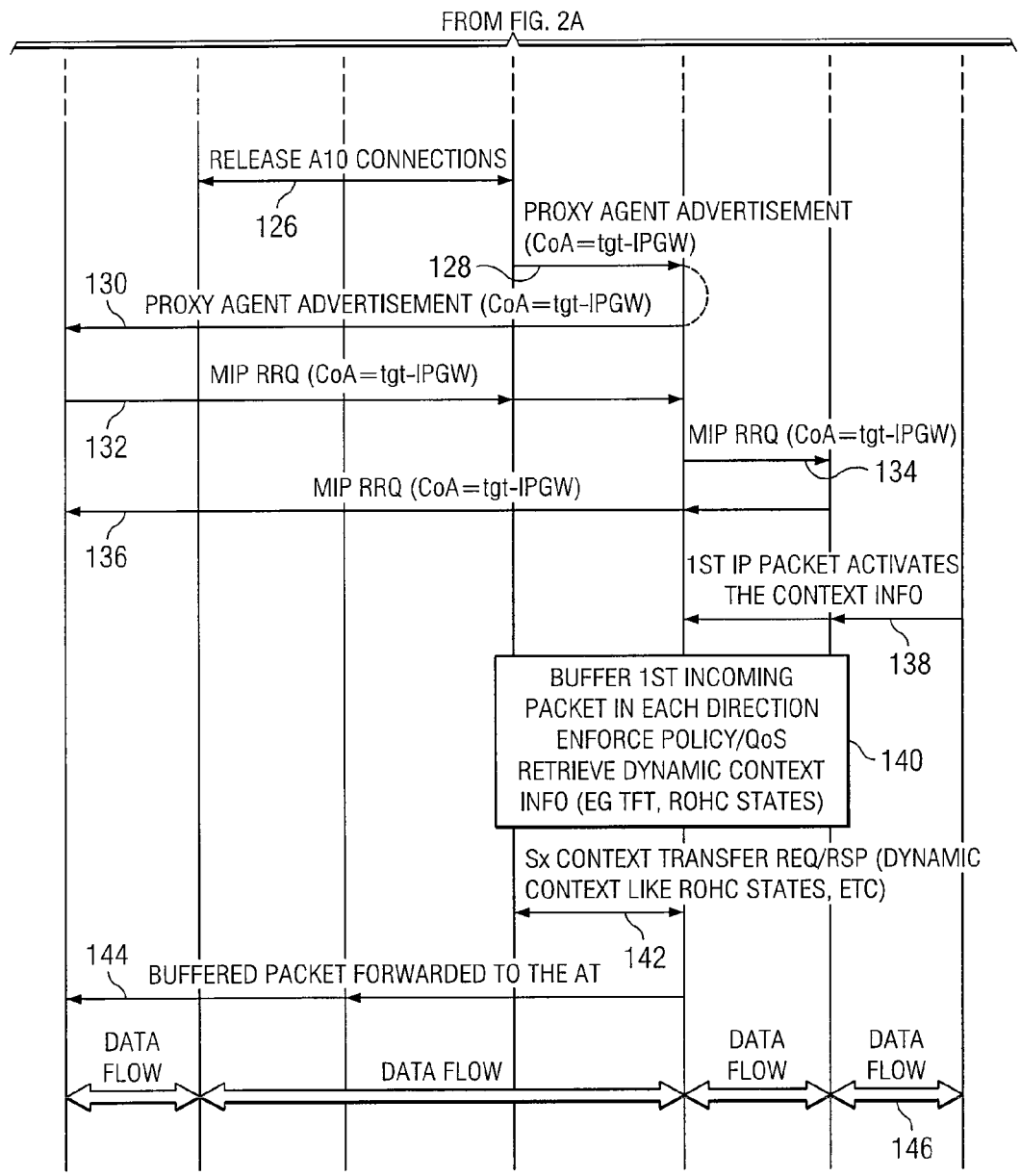

FIG. 2 is a call-flow diagram showing one embodiment of a method that may be implemented on the cellular communication environment 10 for providing handover of an access terminal 18 in a relatively fast manner. This particular call-flow diagram describes a roaming scenario in which access terminal 18 moves its point of attachment from the anchor network 12a to the target network 12b. It should be appreciated, however that a similar procedure may be performed for a roaming scenario in which the access terminal 18 moves its point of attachment from the target network 12b to the anchor network 12a.

At step 100, an IP session is initiated between access terminal 18 and correspondent node 20 through RNC 28a, IP gateway 24a, and the bearer manager 38. In this IP session, various forms of data communication services, such as packet-switched voice call services, e-mail messaging services, instant messaging services, and IP network access services may be conducted in a normal manner.

At step 102, the access terminal 18 crosses a mobility boundary between the anchor network 12a and target network 12b. At step 104, a handover session is configured between the access terminal 18 and RNC 28a. At this point, the RNC 28a determines if the point of attachment of access terminal 18 can be transferred to the RNC 28b. If the point of attachment of the access terminal 18 can be transferred, a route update is established in between the access terminal 18 and RNC 28a for this behavior at step 106.

At step 108, the RNC 28a issues a transfer request message to RNC 28b. This transfer request message may include an IP address of the IP gateway 24a. The RNC 28b identifies resources to accept a point of attachment with the access terminal 18 and subsequently issues a transfer request response message to the RNC 28a at step 110. At step 112, SHO legs are connected from RNC 28a to RNC 28b. At step 114, the session between the access terminal 18 and RNC 28a is updated.

At step 116, the RNC 28b sends an A11 pre-registration request message to the IP gateway 24b. The A11 pre-registration request message may include the IP address of the IP gateway 24a that was provided to the RNC 28b in step 108. The A11 pre-registration request message may also include identification parameters and other HRPD session parameters associated with the access terminal 18. At step 118, the IP gateway 24b acknowledges the A11 pre-registration request message by issuing a registration response message to the RNC 28b and starts preparation for handling an IP session with the access terminal 18.

At step 120, the IP gateway 24b sends a context information request message to the IP gateway 24a. The context information request message may include requests for HRPD session parameters and other information associated with the access terminal 18 for successful handover from IP gateway 24a to IP gateway 24b. The IP gateway 24a uses HRPD session parameters provided in the context information request message to locate the ongoing HRPD session of the access terminal 18 with the RNC 28a. Once located, the IP gateway 24a obtains context information from the ongoing IP session and sends this information in a context information response message to the IP gateway 24b in step 122. At this point, the IP gateway 24b may install any context information rules for the new IP session, such as QoS facets, local admission control properties that may be based upon the QoS facets, or derived security keys.

At step 124, an IP tunnel is established between the IP gateway 24a and IP gateway 24b. The IP tunnel may be sent over any suitable link. In one embodiment, the context information request message may be sent over an IP peering connection established between the IP gateway 24a and the IP gateway 24b. Once the IP tunnel has been established, the IP gateway 24a may begin bicasting packets to the access terminal 18 through RNC 28a and RNC 28b.

At step 126, the A10 connection between the RNC 28a and the IP gateway 24a may be released. In one embodiment, the RNC 28a may wait for an idle signal condition on the bicasted IP session before releasing A10 connection between the RNC 28a and the anchor IP gateway 24a. Certain embodiments of the present disclosure in which the A10 connection is maintained until an idle signal condition is detected may reduce the number of dropped packets that may occur during the handover procedure.

At step 128, IP gateway 24a sends a proxy agent advertisement message to the IP gateway 24b. In response, the IP gateway 24b sends this advertisement message to the access terminal at step 130.

At step 132, the access terminal 18 sends a mobile IP registration request binding update message to the IP gateway 24b. As step 134, the IP gateway 24b forwards this mobile IP registration request binding update message to the bearer manager 38 for registering the new care of address with the home network 14.

At step 136, the bearer manager 38 sends a mobile IP registration response binding update message to the access terminal 18. At this point, handover of the mobile IP session from the IP gateway 24a to the IP gateway 24b is complete.

At step 138, the correspondent node may transmit its first IP packets, which are destined for receipt by the access terminal 18, to the IP gateway 24b. At step 140, the IP gateway 24b may buffer the first incoming packets in each direction, enforce any available authorization rules, such as quality of service, retrieve any dynamic context information associated with the IP session including traffic flow templates (TFTs) or robust header compression (ROHC) states. At step 142, the IP gateway 24b may negotiate the dynamic context information generated in step 140 with the IP gateway 24a.

At step 144, the IP packet received by the IP gateway 24b in step 138 and buffered in step 140 is sent to the access terminal 18. At step 146, the IP session between the access terminal 18 and correspondent node 20 continues. The IP session at step 146 differs from step 100, however in that IP packets are now routed and buffered through the IP gateway 24b rather than the IP gateway 24a.

Modifications, additions, or omissions may be made to the method without departing from the scope of the invention. The method may include more, fewer, or other steps. Additionally, steps may be performed in any suitable order.

Several embodiments of a system and method for providing handover of an access terminal 18 have been described that may be relatively faster than known handover mechanisms for a mobile IP session. In one respect, the handover method as described may alleviate the need to access authentication information from the home network 14 each time the access terminal 18 roams to a new network. Security keys locally maintained in the anchor IP gateway 24a may be transmitted to the target IP gateway 24b during handover. These security keys may be used to authenticate the access terminal 18 on the target IP gateway 24b without accessing master session key information from the home network 14.

The system and method of the present disclosure may also provide a handover mechanism for a mobile IP session that may be triggered by existing handover mechanisms used between adjacent RNCs in a cellular communication environment. Handover of access terminals 18 between RNCs is a well known, established mechanism that is relatively fast and stable. This handover procedure may provide a pre-registration request message to the target IP gateway 24b that triggers handover of the mobile IP session to commence. In this manner, handover of the mobile IP session may occur in a relatively the same time as when handover of the HRPD network occurs.

Although the present invention has been described with several embodiments, myriad changes, variations, alterations, transformations, and modifications may be suggested to one skilled in the art, and it is intended that the present invention encompass such changes, variations, alterations, transformations, and modifications as fall within the scope of the appended claims. The present invention is not intended to be limited, in any way, by any statement in the specification that is not reflected in the claims.

What is claimed is:

1. A system for implementing handover of a mobile Internet Protocol (IP) session in a communication network, comprising:
    a memory operable to store at least one context information rule associated with an access terminal; and
    a processor operable to:
        receive a registration request message from a target radio network controller;
        in response to receipt of the registration request message, transmit a context information request message to an anchor IP gateway with a connection to an anchor radio network controller;
        receive a context information response message from the anchor IP gateway, the anchor IP gateway waiting for an idle signal condition before releasing the connection to the anchor radio network controller, the context information response message including an authorization rule and the at least one context information rule;
        apply the context information rule to the mobile IP by authenticating an access terminal without accessing information from a designated home network;
        buffer a first packet from a correspondent node communicating with the access terminal; and
        enforce the authorization rule of the context information on the first packet.

2. The system of claim 1, wherein the processor is configured in a target IP gateway.

3. The system of claim 1, wherein the processor is further operable to apply the context information rule by:
    authenticating the access terminal using an extended authentication protocol security key included in the context information rule.

4. The system of claim 1, wherein the context information rule comprises an authorization rule that is selected from the group consisting of a quality-of-service level rule, a security level rule, an accounting rule, a mobility rule, a charging rule, and a packet inspection rule.

5. The system of claim 1, wherein the anchor IP gateway is operable to:
    wait, following receipt of the context information response message by the processor, for an idle signal condition on the mobile IP session; and
    release an A10 connection between the anchor radio network controller and the anchor IP gateway.

6. A method for implementing handover of a mobile Internet Protocol (IP) session in a communication network, comprising:
    receiving a registration request message from a target radio network controller;
    in response to receipt of the registration request message, transmitting a context information request message to an anchor IP gateway with a connection to an anchor radio network controller, the context information being associated with an access terminal;
    receiving a context information response message from an anchor IP gateway, the anchor IP gateway waiting for an idle signal condition before releasing the connection to the anchor radio network controller, the context information response message including an authorization rule and the at least one context information rule;
    applying the context information rule to a mobile IP connection by authenticating an access terminal without accessing information from a designated home network;
    buffering a first packet from a correspondent node communicating with the access terminal; and
    enforcing the authorization rule of the context information on the first packet.

7. The method of claim 6, wherein applying the context information rule further comprises:
    authenticating the access terminal using an extended authentication protocol security key included in the context information rule.

8. The method of claim 6, wherein the context information rule comprises an authorization rule that is selected from the group consisting of a quality-of-service level rule, a security level rule, an accounting rule, a mobility rule, a charging rule, and a packet inspection rule.

9. The method of claim 6, further comprising:
    waiting, following receipt of the context information response message, for an idle signal condition on the mobile IP session; and
    releasing an A10 connection between a anchor radio network controller and the anchor IP gateway.

10. A non-transitory computer-readable storage medium encoded with logic for implementing handover of a mobile Internet Protocol (IP) session in a communication network, the logic operable to:
    receive a registration request message from a target radio network controller;
    in response to receipt of the registration request message, transmit a context information request message to an anchor IP gateway with a connection to an anchor radio network controller, the context information being associated with an access terminal;
    receive a context information response message from the anchor IP gateway, the anchor IP gateway waiting for an idle signal condition before releasing the connection to the anchor radio network controller, the context information response message including an authorization rule and the at least one context information rule;
    apply the context information rule to the mobile IP connection by authenticating an access terminal without accessing information from a designated home network;
    buffer a first packet from a correspondent node communicating with the access terminal; and
    enforce the authorization rule of the context information on the first packet.

11. The non-transitory computer-readable storage medium of claim 10, wherein the computer-readable storage medium is configured in a target IP gateway.

12. The non-transitory computer-readable storage medium of claim 10, wherein the logic is further operable to apply the context information rule by:

authenticating the access terminal using an extended authentication protocol security key included in the context information rule.

13. The non-transitory computer-readable storage medium of claim 10, wherein the context information rule comprises an authorization rule that is selected from the group consisting of a quality-of-service level rule, a security level rule, an accounting rule, a mobility rule, a charging rule, and a packet inspection rule.

14. The non-transitory computer-readable storage medium of claim 10, wherein the logic is further operable to:
   wait, following receipt of the context information response message, for an idle signal condition on the mobile IP session; and
   release an A10 connection between an anchor radio network controller and the anchor IP gateway.

15. A system for implementing handover of a mobile Internet Protocol (IP) session in a communication network, comprising:
   means for receiving a registration request message from a target radio network controller;
   in response to receipt of the registration request message, means for transmitting a context information request message to an anchor IP gateway with a connection to an anchor radio network controller, the context information being associated with an access terminal;
   means for receiving a context information response message from an anchor IP gateway, the anchor IP gateway waiting for an idle signal condition before releasing the connection to the anchor radio network controller, the context information response message including an authorization rule and the at least one context information rule;
   means for applying the context information rule to a mobile IP by authenticating an access terminal without accessing information from a designated home network;
   means for buffering a first packet from a correspondent node communicating with the access terminal; and
   means for enforcing the authorization rule of the context information on the first packet.

* * * * *